US005265219A

United States Patent [19]

Gerson et al.

[11] Patent Number: 5,265,219

[45] Date of Patent: Nov. 23, 1993

[54] SPEECH ENCODER USING A SOFT INTERPOLATION DECISION FOR SPECTRAL PARAMETERS

[75] Inventors: Ira A. Gerson, Hoffman Estates; Mark A. Jasiuk, Chicago, both of Ill.

[73] Assignee: Motorola, Inc., Schaumburg, Ill.

[21] Appl. No.: 944,855

[22] Filed: Sep. 14, 1992

Related U.S. Application Data

[63] Continuation-in-part of Ser. No. 534,820, Jun. 7, 1990, abandoned.

[51] Int. Cl.[5] .................. G01L 9/02

[52] U.S. Cl. .................. 395/2.28

[58] Field of Search .................. 381/29–41; 395/2

[56] References Cited

U.S. PATENT DOCUMENTS 4,710,959 12/1987 Feldman et al. .................. 381/36

4,868,867 9/1989 Davidson et al. .................. 381/36

*Primary Examiner*—Allen R. MacDonald

*Assistant Examiner*—Michelle Doerrler

*Attorney, Agent, or Firm*—Wayne J. Egan

[57] ABSTRACT

A speech encoder uses a soft interpolation decision for spectral parameters. For each frame, the encoder first calculates the residual energy for interpolated spectral parameters, and then calculates the residual energy for non-interpolated spectral parameters. The encoder then compares these residual energy calculations. If the encoder determines that the interpolated spectral parameters yields the lowest residual energy, it indicates to a far-end decoder to use the interpolated values for the current frame. Otherwise, it indicates to the far-end decoder to use the non-interpolated values for the current frame. The encoder signals the far-end decoder as to which spectral parameters (interpolated or non-interpolated values) to use by encoding and transmitting a special signalling bit.

8 Claims, 2 Drawing Sheets

SPEECH ENCODER USING A SOFT INTERPOLATION DECISION FOR SPECTRAL PARAMETERS

CROSS-REFERENCE TO RELATED APPLICATION

This is a continuation-in-part of prior application Ser. No. 07/534,820, filed Jun. 7, 1990 now abandoned, by Ira Alan Gerson et al., the same inventors as in the present application, which prior application is assigned to Motorola, Inc., the same assignee as in the present application, and which prior application is hereby incorporated by reference verbatim, with the same effect as though the prior application were fully and completely set forth herein.

FIELD OF THE INVENTION

This application relates to speech encoders including, but not limited to, a speech encoder using interpolation for spectral parameters.

BACKGROUND OF THE INVENTION

It is common to process human speech signals to achieve a smaller bandwidth, thereby improving transmission efficiency. A key issue in such processing is achieving a lower signal bandwidth while maintaining acceptable speech quality. Low bit-rate encoders have been used to reduce the amount of voice signal information required for transmission or storage. In particular, linear predictive coding (hereinafter "LPC") encoders have been used in many low bit rate speech coding applications.

In a typical speech encoder the speech samples are blocked into 15 to 30 ms frames. Each frame may be further partitioned into N subframes, where $N>1$. The frame of speech samples is parameterized by codes. Typically the speech spectral information is coded and transmitted at a frame rate, while other speech information may be coded and transmitted for each subframe. It is known that speech quality improvement may be achieved by updating the spectral parameters at the subframe rather than the frame rate, through interpolation. This process generally produces smoother sounding reconstructed speech, but at the expense of smearing the spectrum in the segments of speech where the speech spectrum changes rapidly.

DESCRIPTION OF THE PREFERRED EMBODIMENT

A speech encoder that uses a soft interpolation decision for spectral parameters is thus disclosed. In accordance with the present invention, the spectral parameters are updated at a subframe rate greater than the frame rate at which they are sent.

In accordance with the present invention, an encoder is arranged for coupling to a decoder via a channel. In one embodiment, the encoder and the decoder are based on an LPC-type algorithm. The encoder and the decoder each have access to the current frame's spectral parameter vector, designated "$A_C$," and the previous frame's spectral parameter vector, designated "$A_L$".

Moreover, the encoder and the decoder each determine two sets of subframe spectral parameter vectors based on $A_C$ and $A_L$. Each set of vectors so determined contains a total of N subframe spectral parameter vectors, one spectral parameter vector corresponding to each of the N subframes in the frame. The sets of vectors are determined as follows: The first set of vectors, designated "$A_I$," is created by interpolating between $A_C$ and $A_L$. The second set of vectors, designated "$A_O$," is based on $A_C$ and $A_L$, and does not utilize interpolation.

Once the two sets of subframe spectral parameter vectors $A_I$ and $A_O$ are generated, the sending encoder determines whether the receiving decoder should use $A_I$ or $A_O$ for decoding the current frame. This determination is based on which set of vectors better represents the current frame of samples. This determination includes calculating the frame residual energy corresponding to $A_I$ and $A_O$, and then selecting the set of vectors which yields the lower residual energy.

Assuming the spectral parameters represent the LPC coefficients, for example, the frame residual energy may be calculated, for example, by filtering each subframe's samples by a corresponding all-zero LPC filter. The energy in the resulting residual sequence is computed by summing the squared values of the residual samples for the entire frame.

Moreover, if the sending encoder determines that $A_I$ yields the lower residual energy, the sending encoder then signals or instructs the far-end receiving decoder to use $A_I$ for the current frame. Otherwise, if the sending encoder determines that $A_O$ yields the lower residual energy for the frame, the encoder then signals or instructs the far-end receiving decoder to use $A_O$ for the current frame. The encoder may signal or instruct the far-end decoder as to which set of subframe spectral parameter vectors to use, $A_I$ or $A_O$, by any convenient method such as, for example, by encoding and transmitting a special signalling bit.

Figure 1:
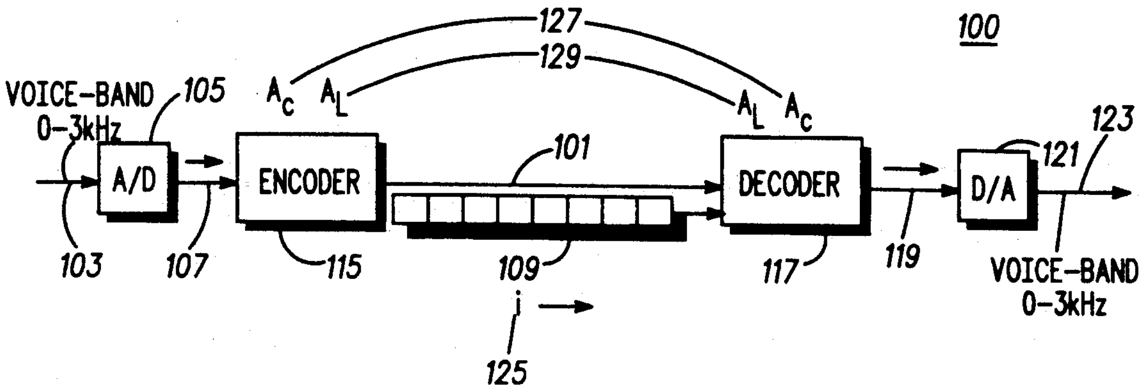
FIG. 1 is a block diagram that shows a communication system 100 that is suitable for demonstrating a first embodiment of a speech encoder using a soft interpolation decision for spectral parameters, in accordance with the present invention.

Referring now to FIG. 1, there is depicted a communication system 100 that is suitable for demonstrating a first embodiment of a speech encoder using a soft interpolation decision for spectral parameters, in accordance with the present invention. As shown, analog voice signals 103 are applied to an analog-to-digital (hereinafter "A/D") converter 105 which, in turn, couples the resulting digital samples 107 to an encoder 115. The encoder 115 partitions the digital samples into input speech frames. Each input speech frame is then converted into a set of digital frame codes, designated as reference numeral 109. The encoder 115 then transmits the set of frame codes 109 to a decoder 117 via a low-bit rate channel 101. The encoder 115 may be, for example, an LPC-type The transmitted set of frame of codes 109 is subsequently received by the decoder 117 which, in turn, converts it into digital samples 119. The digital samples 119 are then input to a digital-to-analog (hereinafter "D/A") converter 121, which ultimately converts them into analog voice signals 123. The decoder 117 may be, for example, an LPC-type.

It will be appreciated that both the encoder 115 and also the decoder 117 always have access to the encoded spectral parameter vector corresponding to the current frame, designated as $A_C$ (reference numeral 127), as well as the encoded spectral parameter vector corresponding to the previous frame, designated as $A_L$ (reference numeral 129). It is assumed that the spectral parameter update rate is N times/frame, where N is an integer greater than 1, and N is the number of subframes per frame.

To determine the set of N subframe spectral parameter vectors to be used for the subframes of the current frame, the encoder 115 generates two sets of N spectral parameter vectors. The first set, designated as $A_I$, is generated by interpolating the spectral parameter vectors, using the current frame's spectral parameter vector $A_C$ and the previous frame's spectral parameter vector $A_L$. The second set, designated as $A_O$, uses non-interpolated spectral parameter vectors, where either $A_C$ or $A_L$ is used at a given subframe.

The input speech frame is partitioned into N subframes. The N subframes of input speech samples are then inverse-filtered by a filter whose coefficients are updated at the subframe rate, corresponding to the interpolated spectral parameter vectors in $A_I$. The N subframes of input speech samples are then inverse-filtered in a similar fashion, except this time based on $A_O$, the set of N non-interpolated spectral parameter vectors. The set of N spectral parameter vectors which yields the smaller frame residual energy is then chosen to be used.

A special signal such as, for instance, a soft interpolation bit represented by the symbol "i" (reference numeral 125) is then sent along with the spectral parameter codes via the channel 101. This bit 125 is used to indicate to the decoder 117 whether the decoder 117 should use the interpolated set of spectral parameter vectors, $A_I$, or the non-interpolated set of spectral parameter vectors, $A_O$, for the current frame.

Figure 2:
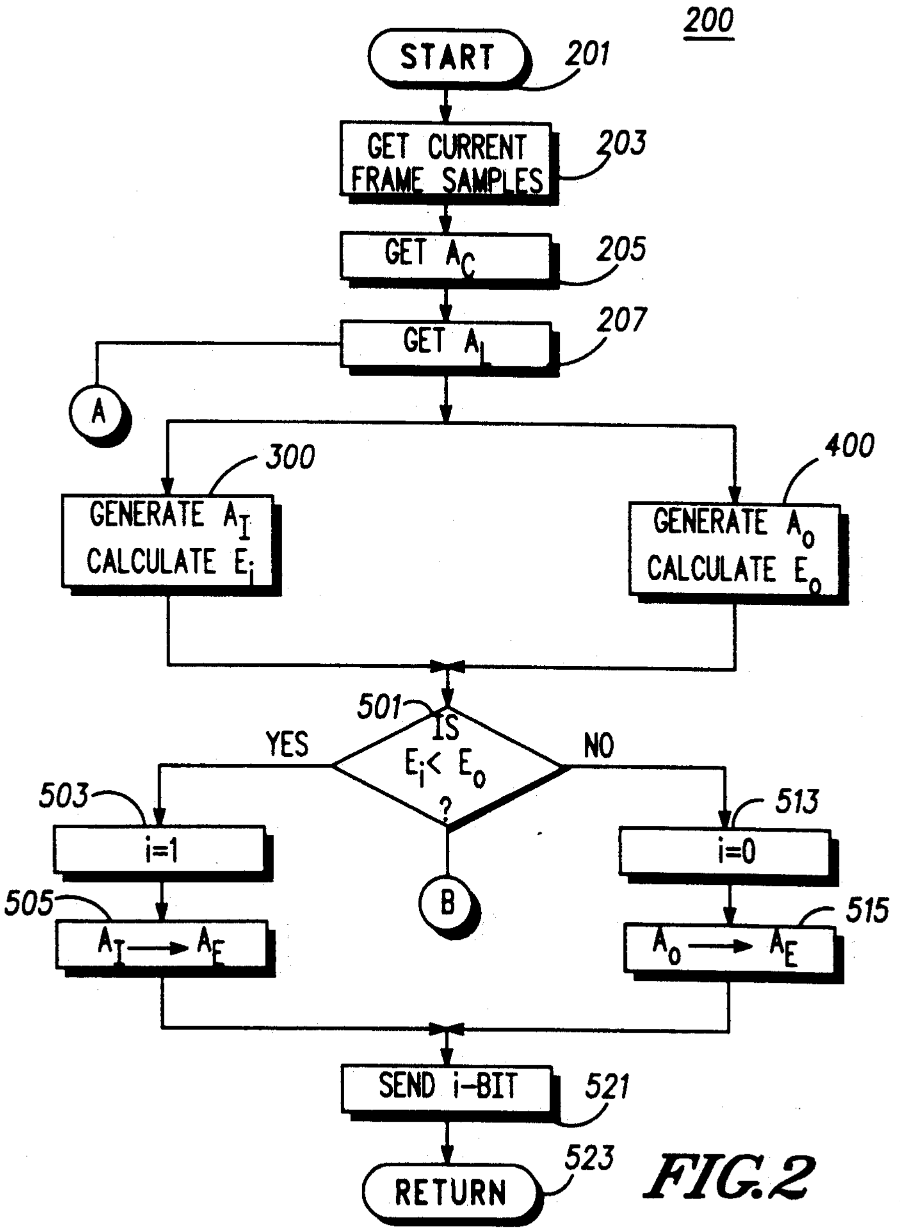
FIGS. 2–4 are flow diagrams for the first embodiment.

FIG. 2 is a first flow diagram for the encoder 115. At a given frame, the process starts at step 201, and then fetches the current frame samples (step 203), the current spectral parameter vector, $A_C$ (step 205), and the previous spectral parameter vector, $A_L$ (step 207).

The next two steps, depicted as step 300 and step 400, may proceed either in series or in parallel. They are dipicted as proceeding in parallel since, all other factors being equal, this would tend to minimize the time delay.

Step 300 generates the set of interpolated subframe spectral parameter vectors $A_I$, and then computes the residual energy corresponding to $A_I$. The residual energy corresponding to $A_I$ is represented by the symbol $E_i$. The residual energy calculation may be performed using any convenient algorithm. (One such suitable algorithm for computing the residual energy $E_i$ corresponding to the interpolated parameters $A_i$, for example, is discussed as part of the discussion of FIG. 3, below.)

Step 400 generates the set of non-interpolated subframe spectral parameter vectors $A_O$, and then computes the residual energy corresponding to $A_O$. The residual energy corresponding to $A_O$ is represented by the symbol $E_o$. The residual energy calculation may be performed using any convenient algorithm. (One such suitable algorithm for computing the residual energy $E_o$ corresponding to the non-interpolated parameters $A_O$, for example, is discussed as part of the discussion of FIG. 4, below.)

The process next goes to step 501, which determines whether $E_i < E_o$.

If $E_i < E_o$, then the determination from step 501 is positive. As a result, the special signalling bit, represented by the symbol "i" (reference numeral 125 in FIG. 1), is set to a logical value of one ($i=1$), step 503. In step 505, $A_I$ is copied onto the set of N subframe spectral parameter vectors to be used in analyzing the current frame. This latter set of vectors which is used in analyzing the current frame is designated "$A_E$". The process then goes to step 521, where the signalling bit "i," having a value of 1, is transmitted to the decoder 117, thereby indicating that the decoder should use the set of interpolated subframe spectral parameter vectors, $A_I$, with the current frame.

Otherwise, if $E_o \leq E_i$, then the determination from step 501 is negative. As a result, the signalling bit "i" is set to a logical value of zero, step 513. In step 515, $A_O$ is copied onto $A_E$, the set of N subframe spectral parameter vectors used in analyzing the current frame. The process then goes to step 521, where the indication bit "i," having a value of 0, is transmitted to the decoder 117, thereby indicating that the decoder should use the set of non-interpolated subframe spectral parameter vectors, $A_O$, with the current frame.

After transmitting the signalling bit, step 521, the process returns (step 523).

Figure 3:
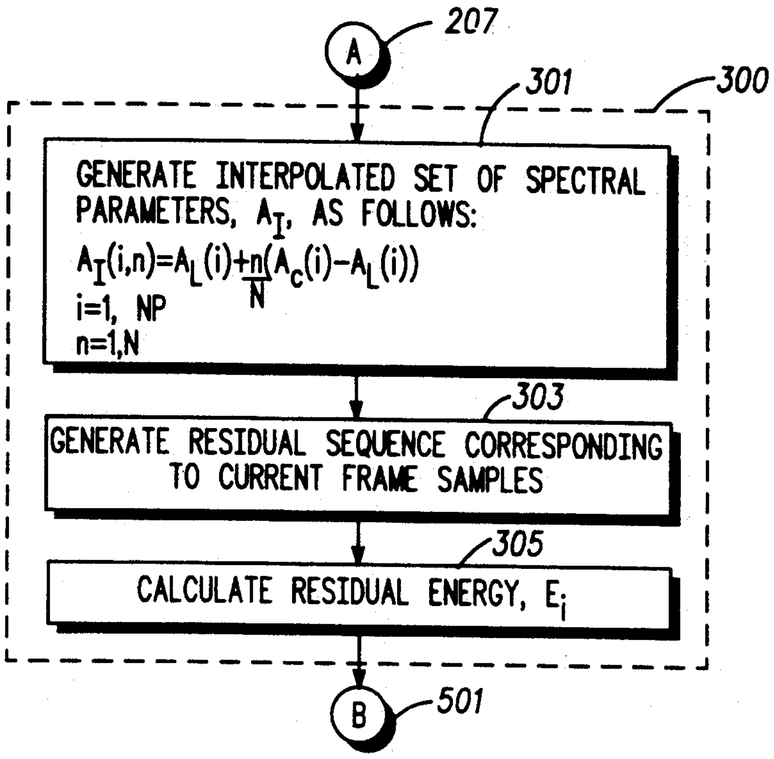

FIG. 3 shows further detail for step 300. Referring momentarily to the preceding FIG. 2, it will be recalled that the current frame samples, the current frame's spectral parameter vector, $A_C$, and the previous frame's spectral parameter vector, $A_L$, previously have been provided by steps 203, 205, and 207, respectively.

Returning now to FIG. 3, the process next goes to step 301, where it generates the set of interpolated subframe spectral parameter vectors, $A_I$, as follows:

$$A_I(i,n)=A_L(i)+n/N[A_C(i)-A_L(i)]$$

$$i=1, NP$$

$$n=1, N$$

where:

$A_I$ = set of N interpolated subframe spectral parameter vectors;

$A_L$ = previous frame's spectral parameter vector;

$A_C$ = current frame's spectral parameter vector;

NP = dimension of the spectral parameter vector; and,

N = number of subframes per frame.

The process next goes to step 303, where it generates the residual samples corresponding to the current frame's samples, based on $A_I$. For example, one method of calculating the frame residual samples is to filter each of the N subframes of samples by a filter based on the corresponding spectral vector from $A_I$.

The process next goes to step 305 where it calculates the residual energy, $E_i$. The residual energy may be computed by summing the squares of the resulting residual sequence samples over the entire frame.

It will be appreciated that there exist other methods for computing the residual energy, $E_i$.

The process then continues with step 501, as discussed above for FIG. 2.

Figure 4:
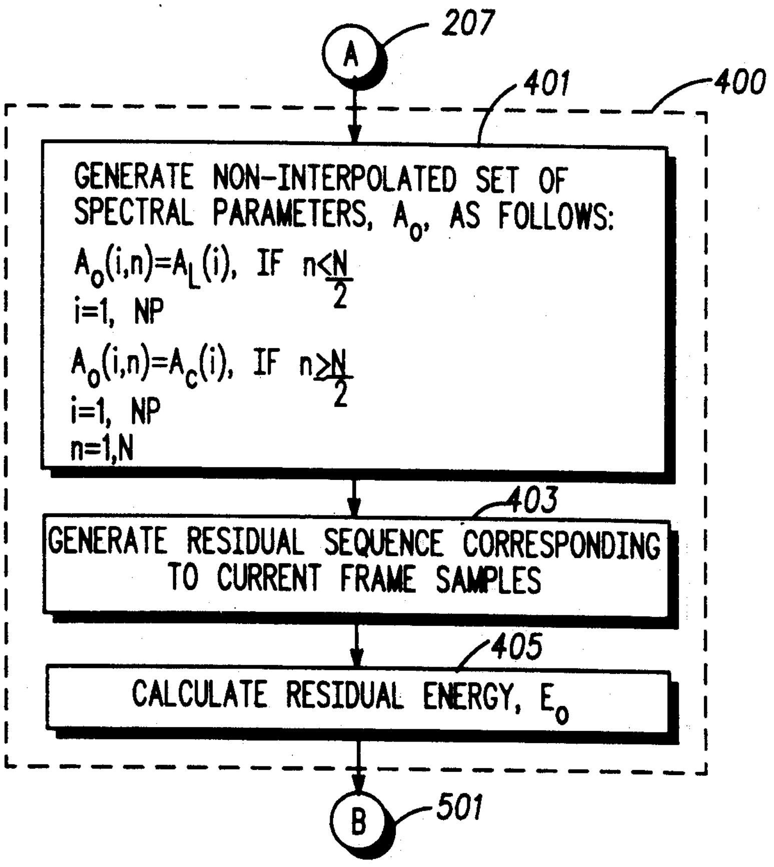

FIG. 4 shows further detail for step 400. Referring momentarily to the preceding FIG. 2, it will recalled that the current frame samples, the current frame's spectral parameter vector, $A_C$, and the previous frame's spectral parameter vector, $A_L$, previously have been provided by steps 203, 205, and 207, respectively.

Returning again to FIG. 4, the process next goes to step 401, where it generates the set of non-interpolated subframe spectral parameter vectors, $A_O$, as follows:

$$A_O(i, n)=A_L(i), \text{ if } n<N/2$$

$$i=1, NP$$

$$A_O(i, n)=A_C(i), \text{ if } n\geqq N/2$$

$$i=1, NP$$

$$n=1, N$$

where:
$A_O$=set of N non-interpolated subframe spectral parameter vectors;
$A_L$=previous frame's spectral parameter vector;
$A_C$=current frame's spectral parameter vector;
NP=dimension of the spectral parameter vector; and,
N=number of subframes per frame.

The process next goes to step 403, where it generates the residual samples corresponding to the current frame's samples, based on $A_O$. For example, one method of calculating the frame residual samples is to filter each of the N subframes of samples by a filter based on the corresponding spectral vector from $A_O$.

The process next goes to step 405 where it calculates the residual energy, $E_o$. The residual energy may be computed by summing the squares of the resulting residual sequence samples over the entire frame.

It will be appreciated that there exist other methods for computing the residual energy, $E_o$.

The process then continues with step 501, as discussed above for FIG. 2.

As compared to previous encoders, one key advantage of a speech encoder using a soft interpolation decision for spectral parameters, in accordance with the present invention, is that it retains the benefits of interpolation, while more accurately representing the spectral transitions. This results in the quality of the reconstructed speech signals available at the far-end receiving decoder being substantially improved, particularly when the spectral parameters are transmitted infrequently.

While various embodiments of a speech encoder using a soft interpolation decision for spectral parameters, in accordance with the present invention, have been described hereinabove, the scope of the invention is defined by the following claims.

What is claimed is:

1. A speech encoder arranged for determining, encoding, and transmitting encoded spectral parameter vectors to a speech decoder via a channel, wherein each encoded spectral parameter vector represents spectral parameters corresponding to a frame of input speech samples, each frame having a plurality (N) of subframes, wherein an encoded spectral parameter vector is transmitted once per frame at a frame rate, and wherein the speech encoder is further arranged to update or revise the spectral parameters at a subframe rate, the speech encoder arranged for determining based on the transmitted encoded spectral parameter vectors a set of subframe spectral parameter vectors to represent the corresponding frame of input speech samples and for transmitting the results of the determination to the speech decoder in accordance with a predetermined method, wherein each vector in the set of subframe spectral parameter vectors corresponds to a subframe in the corresponding frame of input speech samples, and wherein the current frame consists of a first frame portion containing subframes in the first part of the frame and a second frame portion containing subframes in the second part of the frame, the predetermined method comprising the steps of, at the subframe rate:

(a) interpolating between the current frame's encoded spectral parameter vector ("$A_C$") and the previous frame's encoded spectral parameter vector ("$A_L$") to form a set of interpolated subframe spectral parameter vectors ("$A_I$");

(b) forming a set of non-interpolated subframe spectral parameter vectors ("$A_O$") as follows:

(b1) forming the portion of $A_O$ corresponding to subframes in the first frame portion based on $A_L$;

(b2) forming the portion of $A_O$ corresponding to subframes in the second frame portion based on $A_C$;

(c) calculating a first residual energy value ("$E_i$") based on $A_I$ and calculating a second residual energy value ("$E_o$") based on $A_O$;

(d) based on $E_i$ and $E_o$, selecting either $A_I$ or $A_O$ to represent the corresponding frame of input speech samples;

(e) forming a signal based on the set of subframe spectral parameter vectors selected in step (d); and, (f) transmitting the signal formed in step (e) to the speech decoder via the channel.

2. The speech encoder of claim 1 wherein the selecting step (d) further includes the step of:

(d1) determining whether $E_i$ is less than $E_o$.

3. The speech encoder of claim 2 wherein the selecting step (d) further includes the step of:

(d2) selecting $A_I$ to represent the corresponding frame of input speech samples when the determination from step (d1) is positive.

4. The speech encoder of claim 3 wherein the selecting step (d) further includes the step of:

(d3) selecting $A_O$ to represent the corresponding frame of input speech samples when the determination from step (d1) is negative.

5. The speech encoder of claim 4 wherein the speech encoder uses a linear predictive coding ("LPC")-type algorithm for speech encoding.

6. The speech encoder of claim 5 wherein the signal formed as in step (e) is a bit signal having a logical value of 1 or 0.

7. The speech encoder of claim 6 wherein the forming step (e) further includes the step of:

(e1) setting the logical value to 1 when the determination from step (d1) is positive.

8. The speech encoder of claim 7 wherein the forming step (e) further includes the step of:

(e2) setting the logical value to 0 when the determination from step (d1) is negative.

* * * * *